(12) United States Patent
Shiota et al.

(10) Patent No.: US 7,884,873 B2
(45) Date of Patent: Feb. 8, 2011

(54) IMAGE PICKUP DEVICE HAVING A DISPLAY FOR DISPLAYING OPERATION KEY IMAGE DATA REPRESENTING OPERATION KEYS AND SUPPLYING IMAGE DATA INCLUDING AN OPERATION MENU TO AN EXTERNAL DISPLAY DEVICE WHEN CONNECTED TO THE EXTERNAL DISPLAY DEVICE

(75) Inventors: Hiroyuki Shiota, Chiba (JP); Kazuhiko Nishiwaki, Kanagawa (JP); Tetsuya Oda, Aichi (JP); Makoto Omata, Kanagawa (JP); Kazunori Takagi, Tokyo (JP); Kanako Tamamatsu, Kanagawa (JP); Motoki Kobayashi, Tokyo (JP); Ryoko Amano, Tokyo (JP); Kumiko Tsukuda, Kanagawa (JP); Tsutomu Kume, Ibaraki (JP); Hidefumi Fukasawa, Kanagawa (JP)

(73) Assignee: Sony Corporation (JP)

( * ) Notice: Subject to any disclaimer, the term of this patent is extended or adjusted under 35 U.S.C. 154(b) by 476 days.

(21) Appl. No.: 11/511,812

(22) Filed: Aug. 29, 2006

(65) Prior Publication Data

US 2007/0132853 A1    Jun. 14, 2007

(30) Foreign Application Priority Data

Aug. 30, 2005   (JP)   ............................ P2005-250289

(51) Int. Cl.
*H04N 5/222* (2006.01)
(52) U.S. Cl. .............................. 348/333.01; 348/211.99
(58) Field of Classification Search ................ 348/333.1
See application file for complete search history.

(56) References Cited

U.S. PATENT DOCUMENTS 6,154,210 A * 11/2000 Anderson .................... 715/840

(Continued)

FOREIGN PATENT DOCUMENTS

JP      2000-341572      12/2000

(Continued)

*Primary Examiner*—David L Ometz
*Assistant Examiner*—Angel L Garces-Rivera
(74) *Attorney, Agent, or Firm*—Lerner, David, Littenberg, Krumholz & Mentlik, LLP

(57) ABSTRACT

An image pickup device includes a display that displays one of image data including an operation menu or operation key image data representing operation keys; an external output section that outputs the image data including the operation menu to the outside; an output state detector that detects that the external output section is in a state capable of outputting the image data to the outside; a display data instruction section that instructs to display the operation key image data on the display and to display the image data including the operation menu on an external display device, which is an output destination of the image data in the external output section, when the external output section is detected to be in the capable state, and instructs to display the image data including the operation menu on the display when the external output section is not detected to be in the capable state; a display data supply that supplies one of the display or the external output section with one of the image data including the operation menu or the operation key image data in accordance with the instruction from the display data instruction section; and a panel input that accepts input of an operation from one of the operation key image data or the image data including the operation menu displayed on the display.

11 Claims, 9 Drawing Sheets

U.S. PATENT DOCUMENTS 6,738,075 B1 * 5/2004 Torres et al. ................. 715/723
7,239,305 B1 * 7/2007 Nakano et al. ............... 345/179
2001/0011992 A1 * 8/2001 Juen et al. ................... 345/156

FOREIGN PATENT DOCUMENTS

JP          2000341572 A  * 12/2000

* cited by examiner

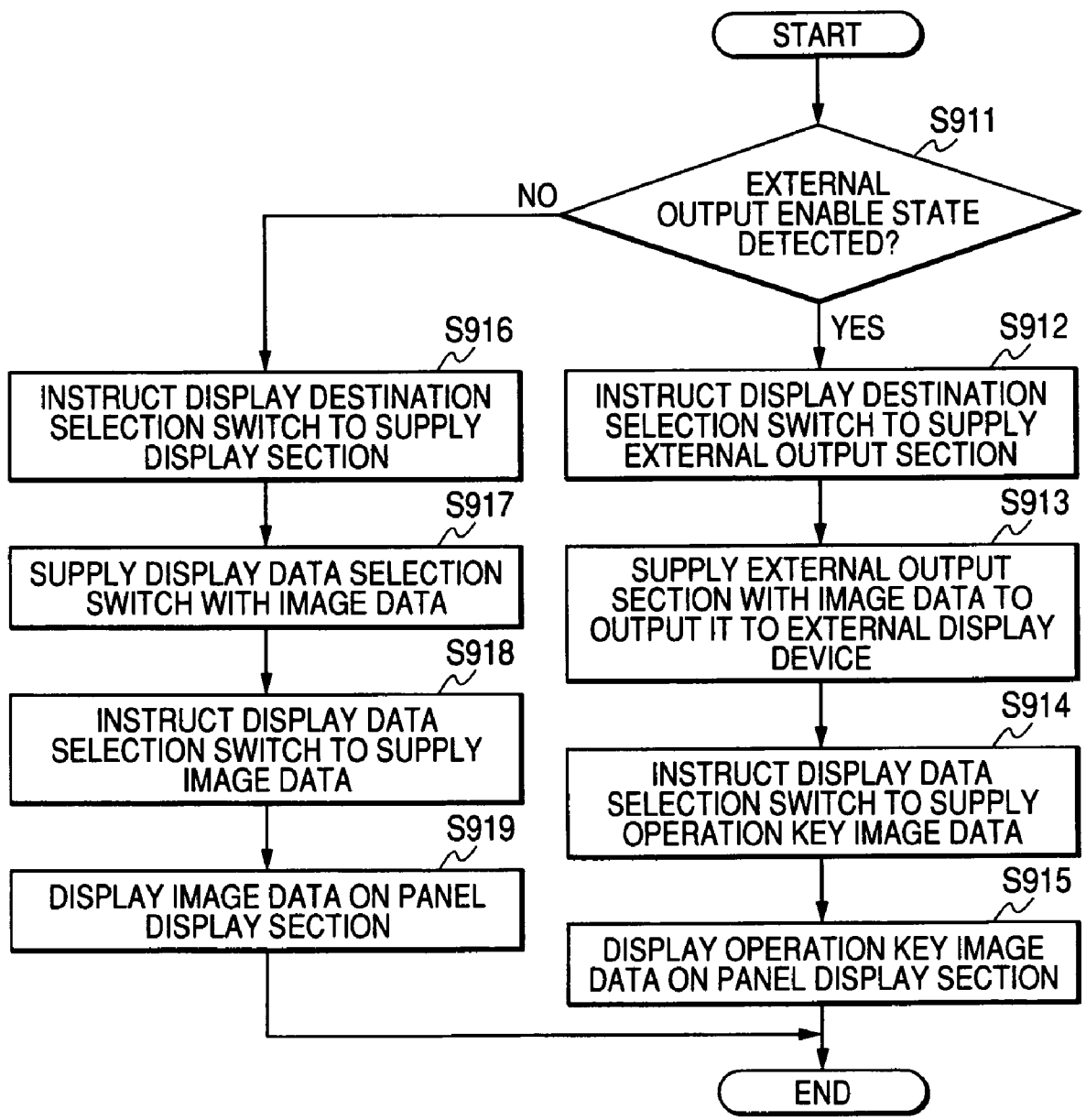

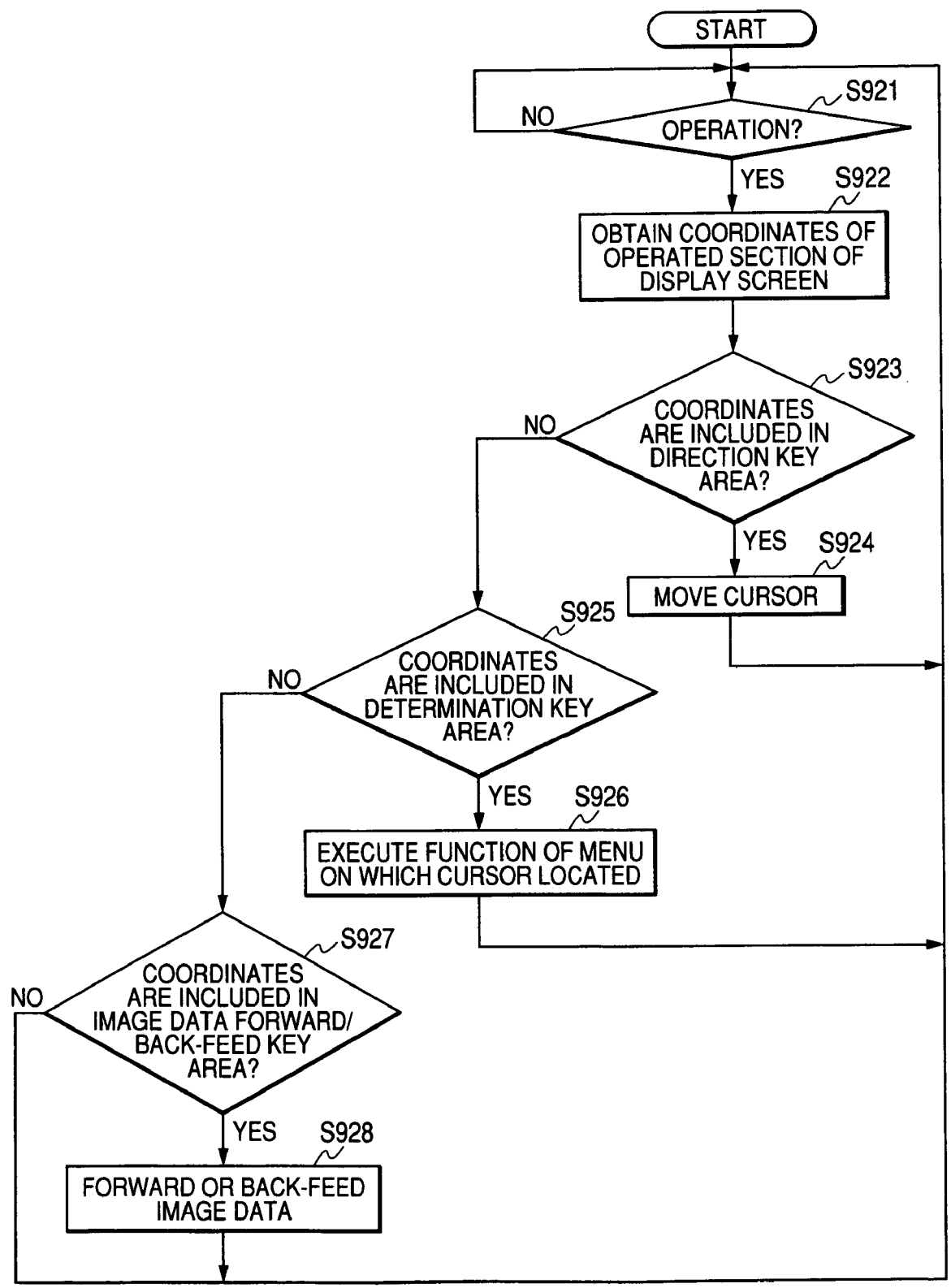

IMAGE PICKUP DEVICE HAVING A DISPLAY FOR DISPLAYING OPERATION KEY IMAGE DATA REPRESENTING OPERATION KEYS AND SUPPLYING IMAGE DATA INCLUDING AN OPERATION MENU TO AN EXTERNAL DISPLAY DEVICE WHEN CONNECTED TO THE EXTERNAL DISPLAY DEVICE

CROSS-REFERENCE TO RELATED APPLICATIONS

The present application claims priority from Japanese Patent Application No. JP 2005-250289 filed on Aug. 30, 2005, the disclosure of which is hereby incorporated by reference herein.

BACKGROUND OF THE INVENTION

1. Technical Field

The present invention relates to an image pickup device, and in particular to an image pickup device allowing operation of an operation menu output to an external display device.

2. Related Art

In recent years, miniaturization of digital cameras has been progressed, and in accordance therewith, liquid crystal monitors equipped to the digital cameras are also in a trend of miniaturization. The miniaturization of digital cameras enhances their portability and convenience. And, at the same time, in browsing the pickup image data, too small liquid crystal monitors make it difficult for the user to look at the pickup image data. Further, the user cannot appreciate strong visuals with too small liquid crystal monitors. In order for solving such a problem, there has been developed an image data external output technology for outputting image data stored in a digital camera to an external display device with a large screen such as a television set.

Although it has become possible to output the image data held in the digital camera to the external large screen display device such as TV with the image data external output technology described above, the operation menu and so on can only be operated from the digital camera side. In particular, in an image pickup device adopting the touch panel system as the operation method of the operation menu, the operation menu must be operated from the liquid crystal monitor of the digital camera, and accordingly, the user must look aside from the TV when operating the operation menu. On the contrary, it is convenient to operate the operation menu while watching the TV. As a technology attempting to realize the convenience, there has been proposed a technology for displaying the operation keys on the display screen of the digital camera while displaying the image data on the TV (see, for example, JP-A-2000-341572 (FIG. 1)). In this technology, the digital camera adopts the touch panel system, and can be operated by directly pushing down the operation keys displayed on the liquid crystal monitor of the digital camera. Thus, it is possible to operate the operation menu while watching the image data displayed on the TV.

However, according to the background technology described above, the liquid crystal monitor of the digital camera is used as a dedicated liquid crystal monitor for displaying the operation keys, and it is assumed that the image data held in the digital camera is always output to the TV. It is more convenient that the image data held in the digital camera can be confirmed in the digital camera when the image data is not output to the TV.

Therefore, it is desirable to provide an image pickup device which displays the operation keys on a built-in display section in response to connection of the external display device for allowing input of the operation.

SUMMARY OF THE INVENTION

According to an embodiment of the invention, there is provided an image pickup device including display means for displaying one of image data including an operation menu or operation key image data representing operation keys; external output means for outputting the image data including the operation menu to the outside; output state detection means for detecting that the external output means is in a state capable of outputting the image data to the outside; display data instruction means for instructing to display the operation key image data on the display means and to display the image data including the operation menu on an external display device, which is an output destination of the image data in the external output means, when the external output means is detected to be in the capable state, and for instructing to display the image data including the operation menu on the display means when the external output means is not detected to be in the capable state; display data supply means for supplying one of the display means or the external output means with one of the image data including the operation menu or the operation key image data in accordance with the instruction from the display data instruction means; and panel input means for accepting input of an operation from one of the operation key image data or the image data including the operation menu displayed on the display means. Thus, there is provided a function that the operation key is displayed on the built-in display section in response to connection of the external display device to allow input of the operation. Therefore, when the image data is output to the external display device, it is possible to operate the operation menu while looking at the image data including the operation menu displayed on the external display device.

Further, in this embodiment of the invention, the display data supply means includes operation key image data storage means for storing the operation key image data, display data selection means for selecting one of the image data including the operation menu or the operation key image data to display on the display means in accordance with the instruction from the display data instruction means, and display destination selection means for selecting one of the display means or the external display device as a display destination of the image data including the operation menu in accordance with the instruction from the display data instruction means. Thus, there is provided a function that the image data including the operation menu and the operation key image data to be displayed on the display screen of the image pickup device are switched from each other by controlling the output destination of the image data including the operation menu and the operation key image data to allow input of the operation.

Further, the display destination selection means includes operation menu image data storage means for storing operation menu image data representing the operation menu, image data processing means for generating and supplying the image data including the operation menu, and a display destination selection switch for selecting one of the display means or the external output means as a destination of the image data including the operation menu supplied from the image data processing means in accordance with the instruction from the display data instruction means. Thus, there is provided a function that the image data including the generated operation menu and the operation key image data to be displayed on the display screen of the image pickup device are switched from each other by controlling the output destination of the image data including the operation menu and the operation key image data to allow input of the operation.

Further, in this embodiment of the invention, the display data supply means includes image data supply means for supplying the display means and the external output means with the image data including the operation menu, operation key image data storage means for storing the operation key image data, and display data selection means for selecting one of the image data including the operation menu or the operation key image data to display on the display means in accordance with the instruction from the display data instruction means. Thus, there is provided a function that the image data including the operation menu and the operation key image data to be displayed on the display screen of the image pickup device are switched from each other by controlling the output of the operation key image data to allow input of the operation.

Further, the image data supply means includes operation menu image data storage means for storing operation menu image data representing the operation menu, and image data processing means for generating and supplying the image data including the operation menu. Thus, there is provided a function that the image data including the operation menu and the operation key image data to be displayed on the display screen of the image pickup device are switched from each other by controlling the output of the operation key image data to allow input of the operation.

Further, in this embodiment of the invention, the image data including the operation menu further includes an image data forward key for causing the display of successive image data next to the image data displayed on the display means, and an image data back-feed key for causing the display of previous image data displayed immediately before the image data displayed on the display means, and the panel input means accepts input of an operation for displaying the successive image data from the image data forward key displayed on the display means and input of an operation for displaying the previous image data from the image data back-feed key displayed on the display means. Thus, there is provided a function that image data forwarding and image data back-feeding operations are allowed by holding down the display screen of the image pickup device.

Further, in this embodiment of the invention, the operation key image data includes image data representing a direction key that moves a cursor in the operation menu and a determination key that selects an operation from the operation menu, and the panel input means accepts the operation from the operation menu from the direction key and the determination key displayed on the display means. Thus, there is provided a function that the operation of the operation menu is allowed by holding down the display screen of the image pickup device while looking at the operation menu displayed on the external display device.

Further, the operation key image data further includes an image data forward key for causing the display of successive image data next to the image data displayed on the display means, and an image data back-feed key for causing the display of previous image data displayed immediately before the image data displayed on the display means, and the panel input means accepts input of an operation for displaying the successive image data from the image data forward key displayed on the display means and the input of an operation for displaying the previous image data from the image data back-feed key displayed on the display means. Thus, there is provided a function that the operations of image data forwarding and image data back-feeding are allowed directly by holding down the display screen of the image pickup device while looking at the operation menu displayed on the external display device.

Further, according to another embodiment of the invention, there is provided an image data display system including an image pickup device; and an external display device connected to the image pickup device, the image pickup device including display means for displaying one of image data including an operation menu or operation key image data representing operation keys, external output means for outputting the image data including the operation menu to the outside, output state detection means for detecting that the external output means is in a state capable of outputting the image data to the outside, display data instruction means for instructing to display the operation key image data on the display means and to display the image data including the operation menu on an external display device, which is an output destination of the image data in the external output means, when the external output means is detected to be in the capable state, and for instructing to display the image data including the operation menu on the display means when the external output means is not detected to be in the capable state, display data supply means for supplying one of the display means or the external output means with one of the image data including the operation menu or the operation key image data in accordance with the instruction from the display data instruction means, and panel input means for accepting input of an operation from one of the operation key image data or the image data including the operation menu displayed on the display means. Thus, there is provided a function that the operation key is displayed on the built-in display section in response to connection of the external display device to allow input of the operation.

According to the embodiment of the invention, there can be provided an advantage of displaying the operation keys on the built-in display section in response to connection of the external display device to allow input of the operation.

BRIEF DESCRIPTION OF THE DRAWINGS

The invention will now be described with reference to the accompanying drawings, wherein like numbers refer to like elements.

FIG. 8 is a flowchart showing a procedure before displaying the image data including the operation menu or the operation key image data on the display section 50 of the image pickup device 100 according to the embodiment of the invention.

FIG. 9 is a flowchart showing a procedure of the operation to a panel input section 52 in the case in which the operation key image data is displayed on the display section 50 according to the embodiment of the invention.

DETAILED DESCRIPTION

Embodiments of the invention will now be explained in detail with reference to the accompanying drawings.

Figure 1:
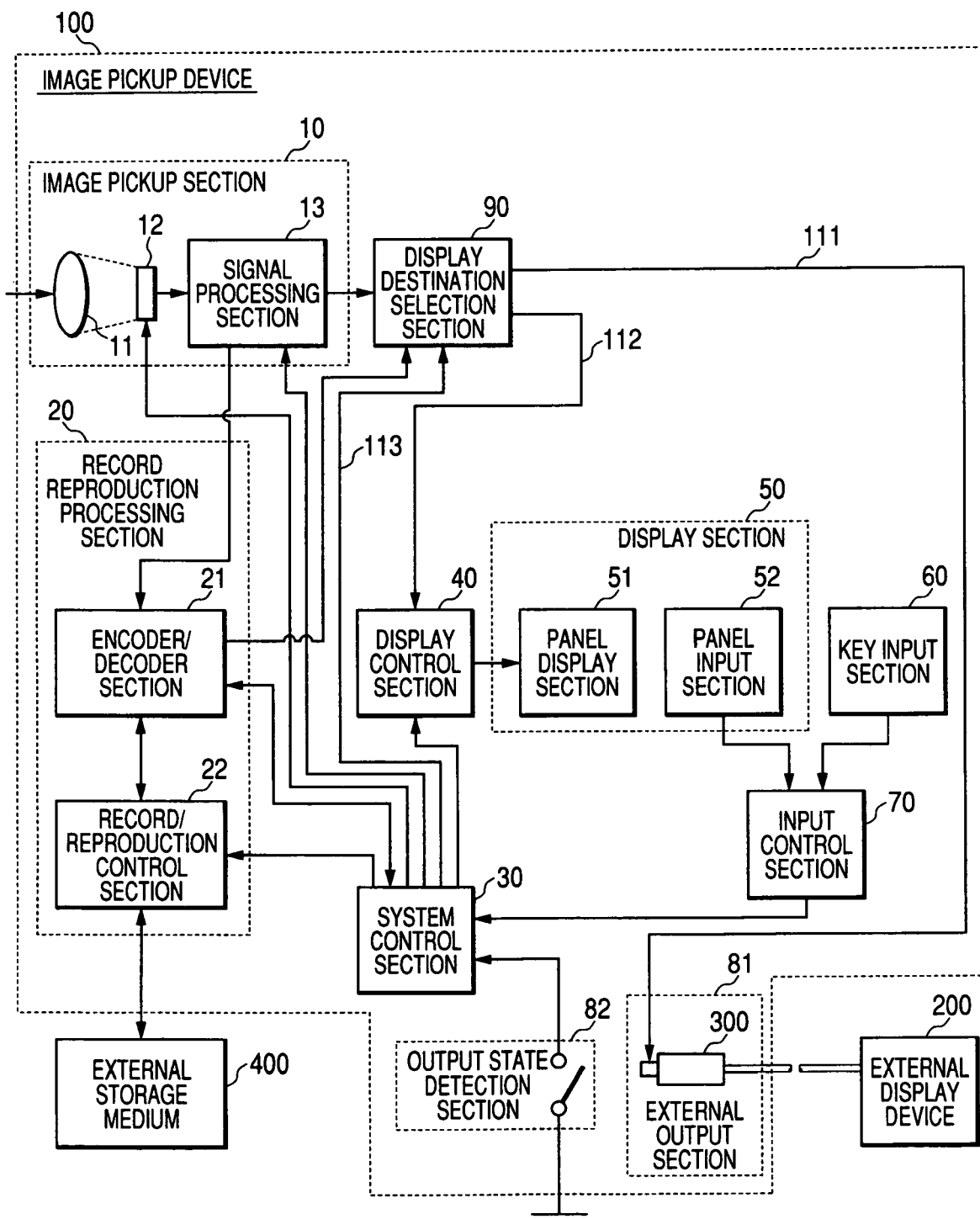
FIG. 1 is a block diagram showing an image display system according to an embodiment of the invention.

FIG. 1 is a block diagram showing an image display system according to the embodiment of the invention. This image display system is configured including an image pickup device 100 and an external display device 200.

The image pickup device 100 is provided with an image pickup section 10, a record reproduction processing section 20, a system control section 30, a display control section 40, a display section 50, a key input section 60, an input control section 70, an external output section 81, an output state detection section 82, and a display destination selection section 90.

The image pickup section 10 is provided with a lens section 11, an image pickup element section 12, and a signal processing section 13. The lens section 11 fulfills a role of providing an image of an object of image pickup on the image pickup elements. The image pickup element section 12 is composed of image pickup elements such as charge-coupled devices (CCD), and an image is formed on the image forming surfaces of the image pickup elements through the lens section 11. In response to an image capture timing signal supplied from a system control section 30 in accordance with a shutter operation, this image pickup element section 12 converts the object image formed on the image forming surfaces into an image pickup signal and supplies it to the signal processing section 13.

The signal processing section 13 performs a process such as gamma correction or automatic gain control (AGC) on the image pickup signal in accordance with a control signal from the system control section 30, and also performs a process for converting the image pickup signal into image data as a digital signal. Further, the signal processing section 13 performs white balance control and so on in addition on the image data based on the control signal from the system control section 30.

The display destination selection section 90 performs a process for involving the operation menu image data in the image data supplied from the signal processing section 13 or an encoder/decoder section 21, and outputs the image data including the operation menu image data through either one of data lines 111 and 112 in accordance with the control signal supplied from the system control section via a signal line 113.

The record reproduction processing section 20 is provided with the encoder/decoder section 21 and record/reproduction control section 22. The encoder/decoder section 21 has an encoding function of encoding and multiplexing the image data and so on output form the signal processing section 13 to convert into compressed data. Meanwhile, the encoder/decoder section 21 also has a decoding function of decoding the compressed data to obtain the image data.

The record/reproduction control section 22 receives the compressed data from the encoder/decoder section 21, and writes it in an external storage medium 400. Further, the recode/reproduction control section 22 retrieves the compressed data from the external storage medium 400, and outputs it to the encoder/decoder section 21. As the external storage medium 400, for example, optical disks such as CD or DVD are assumable, but they are only alternatives, and other storage media than the optical disks can also be used. Further, the storage medium can also be located inside the image pickup device 100. In this case, as the internal storage medium, for example, a hard disk or a flash memory is assumable, but not limited thereto.

The system control section 30 controls the over all process of the image pickup device 100. The display control section 40 performs a process of displaying the image data output from the display destination selection section 90 on a panel display section 51, which is a part of the display section 50. Further, the display control section 40 according to the embodiment of the invention stores the operation key image data for representing the operation keys, and selects either one of the image data and the operation key image data to display it on the panel display section 51 in accordance with the control signal from the system control section 30. It should be noted that as the panel display section 51, for example, a liquid crystal display (LCD) is assumable, but not limited thereto.

The panel input section 52 as a part of the display section 50 is an operation input device formed on the surface of the panel display section 51, and accepts the input of the operation when the display screen in the display section 50 is held down. Namely, the panel input section 52 is a touch panel type of input device. The key input section 60 is provided with a plurality of keys such as a mode-switching key for switching the image pickup mode with other modes such as a reproduction mode, a zoom adjustment key, a key for adjusting exposure, a shutter key, a movie shooting key.

The input control section 70 transmits the operation signal from the panel input section 52 or the key input section 60 to the system control section 30. The system control section 30 discriminates which operation is performed in the panel input section 52 or the key input section 60, and performs the control process corresponding to the discrimination result.

The external output section 81 is for outputting the image data including the operation menu to the outside. Although the configuration for outputting the image data including the operation menu to the outside via the external output cable 300 is shown in FIG. 1, this is not so limited, but a configuration for outputting the image data including the operation menu to the outside in a wireless manner, for example, can also be adopted. When the external output cable 300 is inserted to the external output section 81, the external output cable 300 is connected to a data line 111, thus making it possible to output the image data from the display destination selection section 90 to the external display device 200.

The output state detection section 82 is for detecting that the external output section 81 is in a state capable of outputting the image data to the outside. In FIG. 1, the output state detection section 82 is configured as a switch whose contact is connected by connecting the external output cable 300 to the external output section 81, and detects that the external output section 81 is in the state capable of outputting the image data to the outside when the switch is turned on.

In the condition in which the image pickup device 100 according to the embodiment of the invention and the external display device 200 are connected to each other via the external output cable 300, the operation key image data described above is displayed on the panel display section 51 of the image pickup device 100, while the image data including the operation menu is displayed on the external display device 200. And, the operation input is accepted in a part of the panel display section 51 where the operation key image data is displayed. Thus, it becomes possible to operate the operation menu while looking at the image data including the operation menu displayed on the external display device 200.

Figure 2:
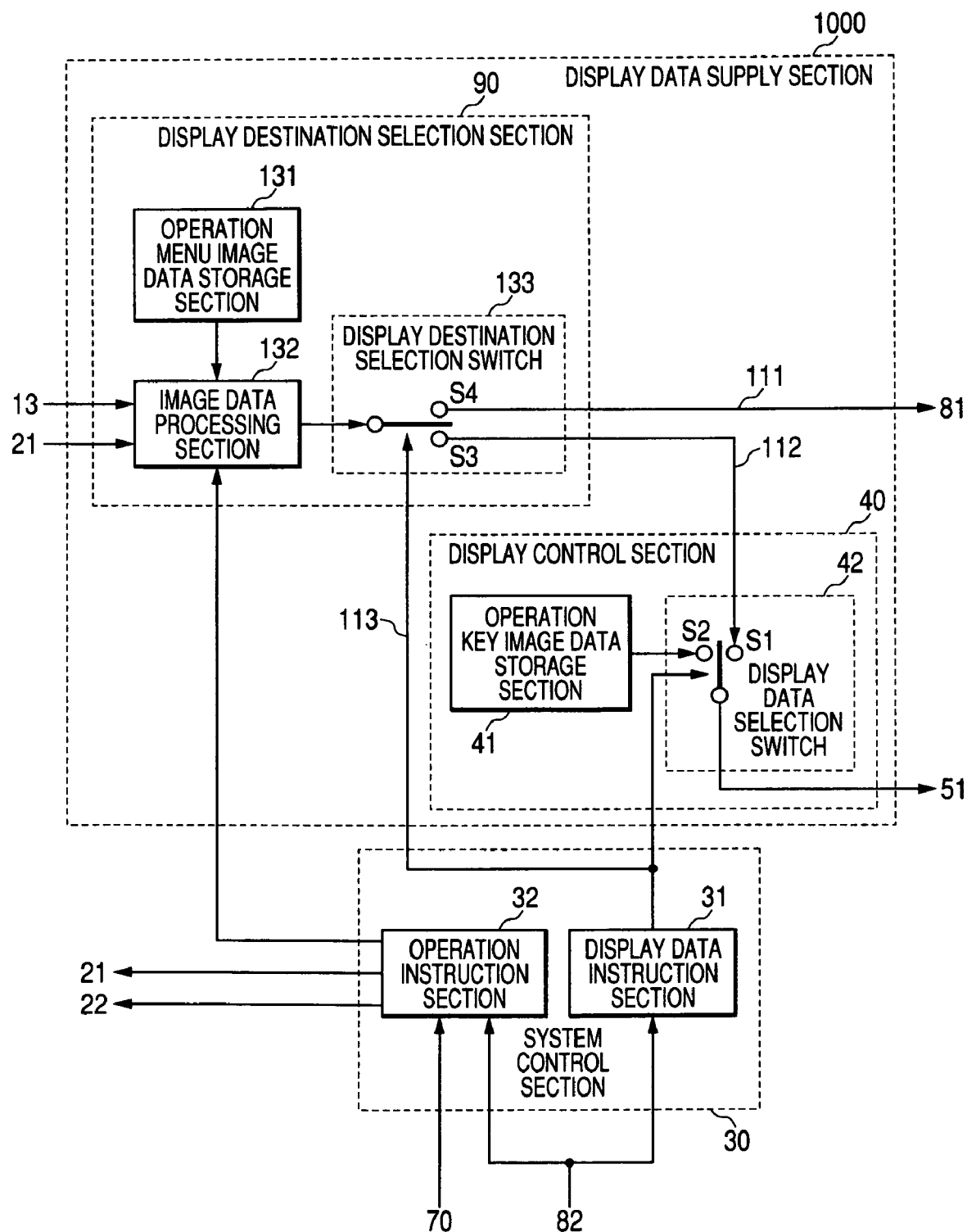
FIG. 2 is a diagram showing an example of the configuration of a display switching function according to an embodiment of the invention.

FIG. 2 is a diagram showing an example of the configuration of a display switching function according to the embodiment of the invention. The display switching function according to the embodiment of the invention is realized by the system control section 30 controlling the image data and the operation key image data supplied to the panel display section 51 and the external display device 200, respectively, from the display data supply section 1000.

The system control section 30 is provided with a display data instruction section 31 and an operation instruction section 32. The display data instruction section 31 performs instruction of display data to be displayed on the panel display section 51 and the external display device 200 based on the detection result in the output state detection section 82.

Specifically, in response to receiving a notification from the output state detection section 82 that the external output section 81 is in the state capable of outputting the image data to the outside, the display data instruction section 31 instructs the display data selection switch 42 to turn on the S2 side, and instructs the display destination selection switch 133 to turn on the S4 side.

On the contrary, while the notification that the external output section 81 is in the state capable of outputting the image data to the outside is not received from the output state detection section 82, the display data instruction section 31 instructs the display data selection switch 42 to turn on the S1 side, and instructs the display destination selection switch 133 to turn on the S3 side.

The operation instruction section 32 is provided with a table having predetermined operation instructions and areas of the display section 50 on the display screen corresponding to each other. The coordinate of the panel input section 52 located on the display screen of the display section 50 which is held down from the outside is supplied to the operation instruction section 32 via the input control section 70. The operation instruction section 32 performs instruction corresponding to the supplied coordinate while looking up the table described above. Further, the operation instruction section 32 is provided with two tables, one used for the case in which the output state detection section 82 detects that the external output section 81 is in the state capable of outputting the image data to the outside, and the other used in the case in which the output state detection section 82 does not detect that the external output section 81 is in the state capable of outputting the image data to the outside, and performs the operation instruction using corresponding one of the tables to the notification from the output state detection section 82.

Namely, if the output state detection section 82 detects that the external output section 81 is in the state capable of outputting the image to the outside, the operation key image data is displayed on the display section 50, and accordingly, the operation instruction is performed using the table corresponding to the operation key image data. Further, if the output state detection section 82 does not detect that the external output section 81 is in the state capable of outputting the image data to the outside, the image data including the operation menu image data is displayed on the display section 50, and accordingly, the operation instruction is performed using the table corresponding to the operation menu image data.

The display data supply section 1000 is for supplying data to be displayed on the panel display section 51 and the external display device 200 in accordance with the instruction from the display data instruction section 31, and is provided with the display destination selection section 90 and the display control section 40.

The display destination selection section 90 is provided with the operation menu image data storage section 131, the image data processing section 132, and the display destination selection switch 133.

The operation menu image data storage section 131 is for holding the operation menu image data representing the operation menu. The image data processing section 132 obtains predetermined operation menu image data from the operation menu image data storage section 131 to perform a process for involving the predetermined operation menu image data in the image data supplied from the signal processing section 13. Further, the image data processing section 132 performs a process for involving the predetermined operation menu image data also to the image data output from the operation instruction section 32 and stored in the external storage medium 400.

The display destination selection switch 133 is for selecting the display destination of the image data including the operation menu supplied from the image data processing section 132 in accordance with the instruction from the display data instruction section 31.

In the case in which the supply destination of the image data including the operation menu supplied from the image data processing section 132 is the external output section 81, namely, in the case in which the output state detection section 82 detects that the external output section 81 is in the state capable of outputting the image data to the outside, the display data instruction section 31 instructs the display destination selection switch 133 to turn on S4, and the display destination selection switch 133 then turns on S4 to supply the external output section 81 with the image data including the operation menu through the data line 111.

In the case in which the supply destination of the image data including the operation menu supplied from the image data processing section 132 is the panel display section 51, namely, in the case in which the output state detection section 82 does not detect that the external output section 81 is in the state capable of outputting the image data to the outside, the display data instruction section 31 instructs the display destination selection switch 133 to turn on S3, and the display destination selection switch 133 then turns on S3 to supply the display data selection switch 42 with the image data including the operation menu through the data line 112.

The display control section 40 is provided with the operation key image data storage section 41 and the display data selection switch 42. The operation key image data storage section 41 is for holding the operation key image data as the image data representing the operation key. As the operation key image data, for example, directional keys for moving the cursor in the operation menu and the determination key for determining either one of the operation menu are assumable, but not limited there to.

The display data selection switch 42 is for outputting to the panel display section 51 either one of the image data including the operation menu supplied from the display destination selection switch 133 in accordance with the instruction from the display data instruction section 31 and the operation key image data held in the operation key image data storage section 41.

In the case in which the supply destination of the image data including the operation menu supplied from the image data processing section 132 is the external output section 81, namely, in the case in which the output state detection section 82 detects that the external output section 81 is in the state capable of outputting the image data to the outside, the display data instruction section 31 instructs the display data selection switch 42 to turn on S2, and the display data selection switch 42 then turns on S2 to allow the panel display section 51 to display the operation key image data.

In the case in which the supply destination of the image data including the operation menu supplied from the image data processing section 132 is the panel display section 51, namely, in the case in which the output state detection section 82 does not detect that the external output section 81 is in the state capable of outputting the image data to the outside, the display data instruction section 31 instructs the display data selection switch 42 to turn on S1, and the display data selection switch 42 then turns on S1 to allow the panel display section 51 to display the image data including the operation menu.

Figure 3:
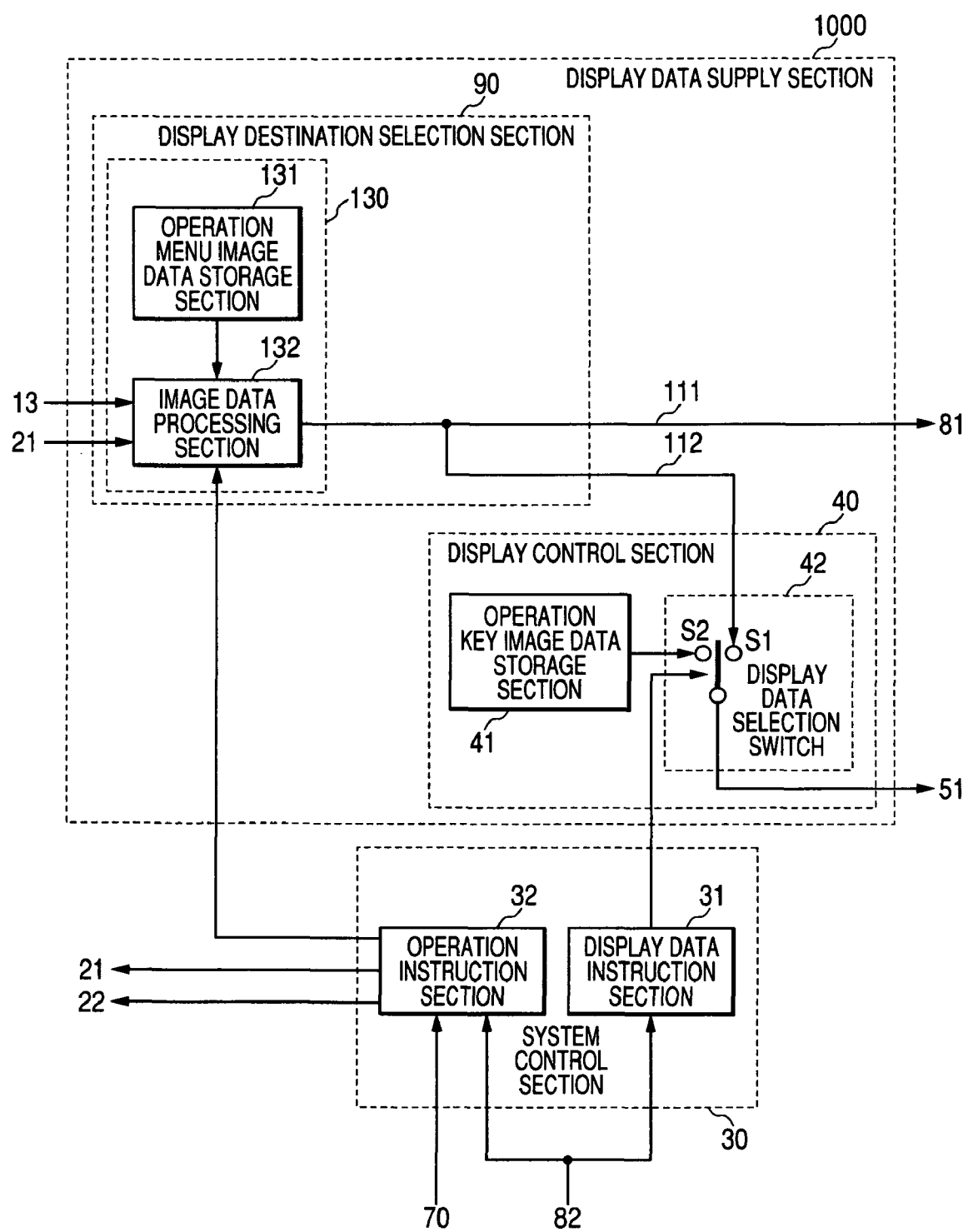
FIG. 3 is a diagram showing an example of the configuration of a display switching function according to another embodiment of the invention.

FIG. 3 is a diagram showing an example of the configuration of a display switching function according to another embodiment of the invention. The configuration of the display switching function in FIG. 3 is obtained by removing the display destination selection switch 133 and the signal line 113 from the display destination selection section 90 in the configuration of the display switching function shown in FIG. 2. It should be noted that the image data supply section 130 in FIG. 3 is provided with the operation menu image data storage section 131 and the image data processing section 132 in FIG. 2. And, the image data including the operation menu output from the image data processing section 132 is output to both the external output section 81 and the panel display section 51.

Therefore, in another embodiment of the invention, output of the image data including the operation menu to the external output section 81 and the panel display section 51 can be controlled only by making instructions from the display data instruction section 31 to the display data selection switch 42. Since other functions denoted with the same reference numerals or having the same names are the same as those explained with reference to FIG. 2, the descriptions therefor will be omitted here.

Figure 4A:
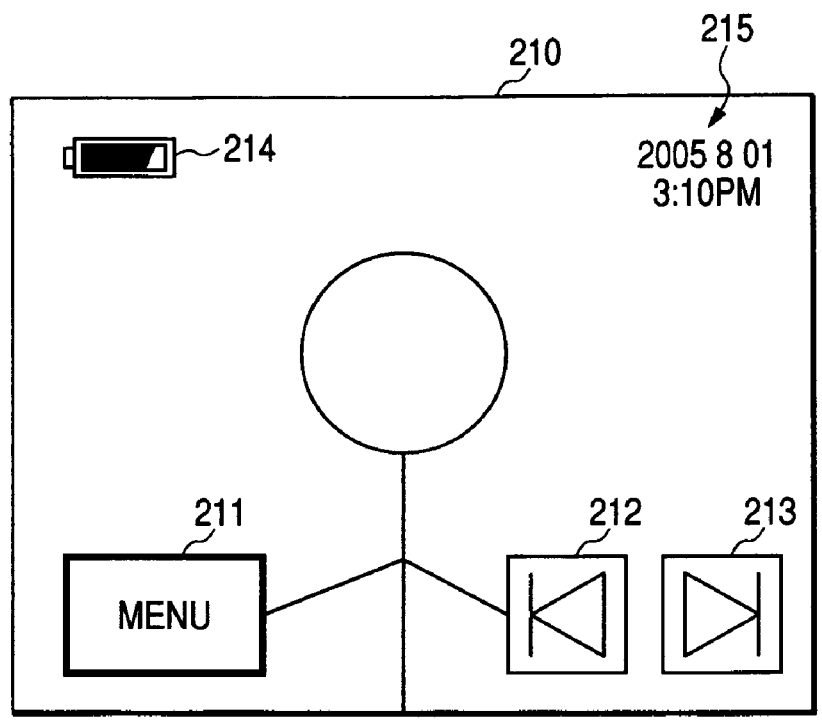
FIGS. 4A and 4B are diagrams showing appearances of display screens of an external display device 200 and a display section 50 in the case in which an output state detection section 82 detects that an external output section 81 is in the state in which image data can be output to the outside.
Figure 4B:
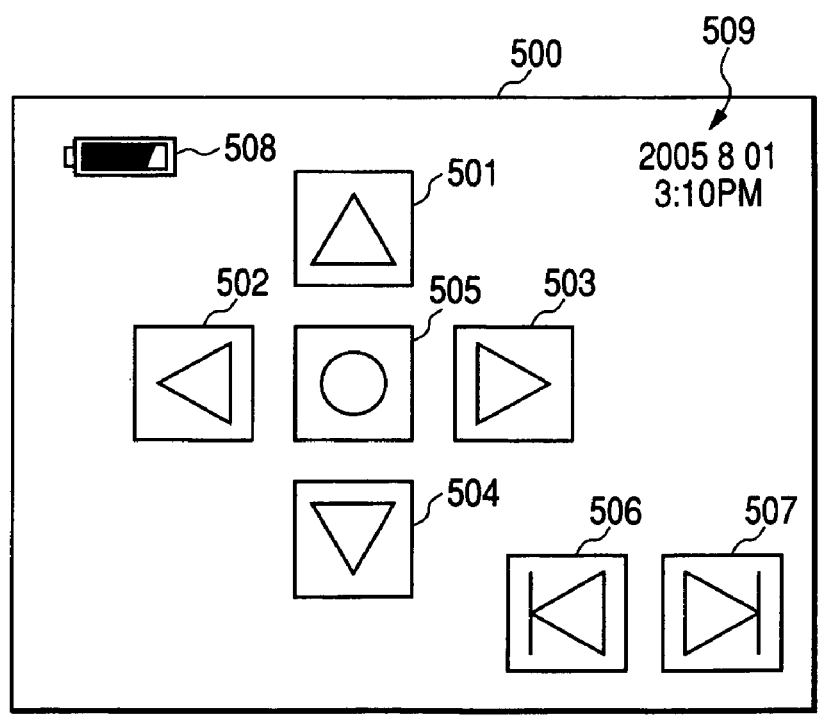

FIGS. 4A and 4B are diagrams showing appearances of display screens of the external display device 200 and the display section 50 in the case in which the output state detection section 82 detects that the external output section 81 is in the state in which the image data can be output to the outside.

FIG. 4A is a diagram showing an appearance of the display screen 210 of the external display device 200. In the display screen 210 of the external display device 200, there are displayed an operation menu indication 211, an image data back-feed indication 212, an image data forward indication 213, a battery remaining amount indication 214 showing the remaining amount of the battery of the image pickup device 100, and an image pickup date and hour indication 215 showing the image pickup date and hour. It should be noted that in FIG. 4A, the border line of the operation menu indication 211 is thicker than other border lines, which shows that the cursor is located in the operation menu indication 211.

It should also be noted that the image data back-feed indication 212 is for indicating that an operation (hereinafter referred to as an image data back-feed operation) for displaying the previous image data displayed immediately before the present image data is displayed on the display screen 210 has been accepted. Further, the image data forward indication 213 is for indicating that an operation (hereinafter referred to as an image data forward operation) for displaying the next image data displayed after the present image data is displayed on the display screen 210 has been accepted.

Namely, assuming the still image data stored arranged in a predetermined order as the image data, for example, if the image data forward operation is performed, a still image data arranged next to the still image data presently displayed on the display screen 210 is displayed on the display screen 210 (hereinafter referred to as image data forwarding), and the image data forward indication 213 is displayed with a color. Further, in this case, if the image data back-feed operation is performed, a still image data arranged right before the still image data presently displayed on the display screen 210 is displayed on the display screen 210 (hereinafter referred to as image data back-feeding), and the image data back-feed indication 212 is displayed with a color Still further, assuming the moving image as the image data, if the image data forward operation is performed, the frame forward of the moving image data is performed as the image data forwarding, and the image data forward indication 213 is displayed with color. Further, in this case, if the image data back-feed operation is performed, the frame back-feeding of the moving image data is performed as the image data back-feeding, and the image data back-feed indication 212 is displayed with color It should be noted that in the moving picture expert group (MPEG)-2 encoding method, for example, the moving image as long as 0.5 second is realized by sequentially displaying fifteen frames (images) called group of pictures (GOP), and the frame forwarding is defined as, for example, not sequentially displaying the fifteen frames (images), but sequentially displaying the frames (images) every several frames. In contrast, the frame back-feeding is defined as, on the contrary, sequentially displaying the frames (images) every several frames in the reverse direction.

FIG. 4B is a diagram showing an appearance of the display screen 500 of the display section 50. There are displayed on the display screen 500 of the display section 50 the upward key 501 for moving the cursor in the operation menu upward, the leftward key 502 for moving the cursor in the operation menu leftward, the rightward key 503 for moving the cursor in the operation menu rightward, the downward key 504 for moving the cursor in the operation menu downward, the determination key 505 for determining one of the items in the operation menu, the image data back-feed key 506 as the input key for the image data back-feed operation, and the image data forward key 507 as the input key for the image data forward operation.

When the image data back-feed key 506 or the image data forward key 507 is held down, the image data back-feed indication 212 or the image data forward indication 213 shown in FIG. 4A is respectively displayed with color in response thereto. It should be noted that the operation keys shown in FIG. 4B are only an example, and do not exclude any keys with any other functions.

Further, similarly to the appearance shown in FIG. 4A, the battery remaining amount indication 508 showing the remaining amount of the battery of the image pickup device 100 and the image pickup date and hour indication 509 showing the image pickup date and hour are also displayed on the display screen 500 of the display section 50.

Figure 5A:
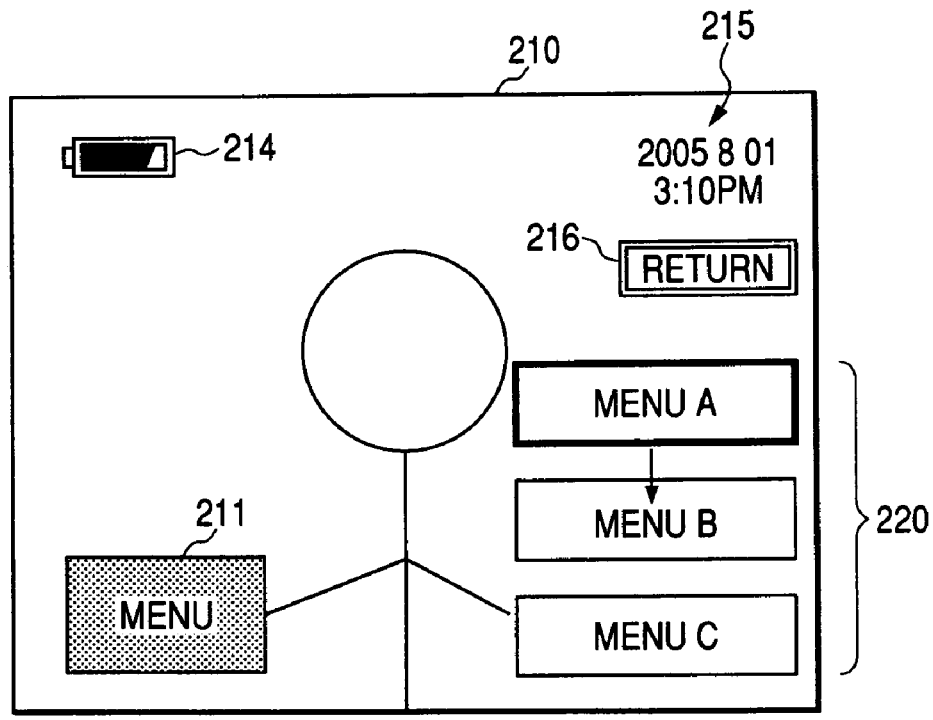
FIGS. 5A and 5B are diagrams showing the way of operating a menu displayed on the external display device 200 with operation keys displayed on the display section 50.
Figure 5B:
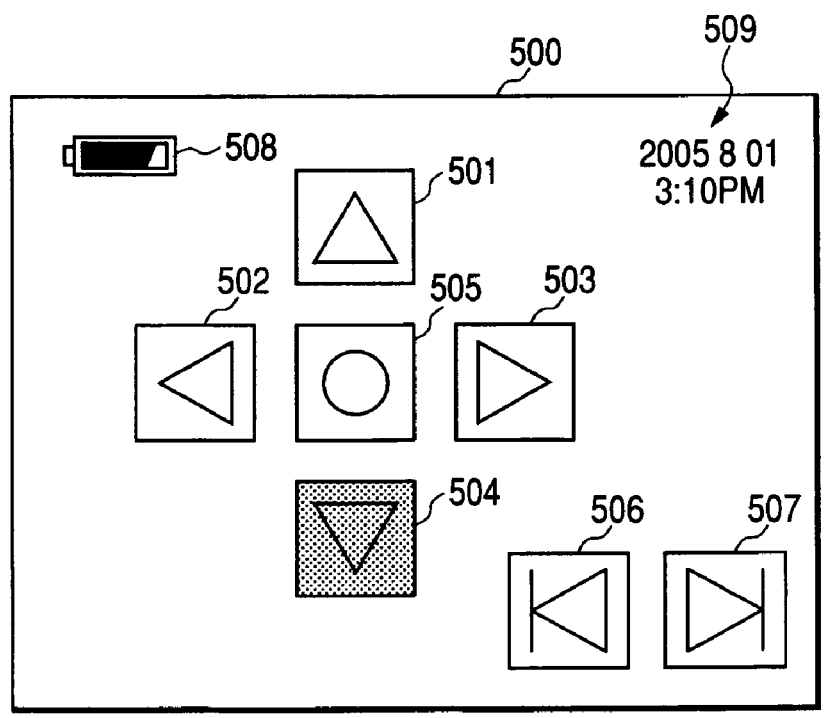

FIGS. 5A and 5B are diagrams showing the way of operating the menu displayed on the external display device 200 with operation keys displayed on the display section 50. In the display screen 210 of the external display device 200 shown in FIG. 4A, when moving the cursor to the operation menu indication 211 with the direction keys and holding down the determination key 505, a specific detailed operation menu indication 220 is displayed on the display screen 210 as shown in FIG. 5A. When moving the cursor to either one of the menu A through menu C of the detailed operation menu indication 220 with the direction keys 501 through 504 displayed in the display screen 500 of the display section 50 shown in FIG. 5B and then holding down the determination key 505, the function corresponding to that one of the menu A through menu C is performed. For example, although the cursor is located in the menu A in FIG. 5A, when the cursor is moved to either one of the menu B and menu C with the downward key 504 and then the determination key 505 is held down, the function corresponding to that one of the menu B and menu C is performed.

Further, in order for going back to the previous screen image before the detailed operation menu indication 220 is displayed, the cursor shown in FIG. 5A is moved to the return button 216 with the direction keys displayed on the display screen 500 of the display section 50 shown in FIG. 5B, and then the determination key 505 is held down. Thus, the previous screen image to the detailed operation menu indication 220 is restored. It should be noted that the previous screen image to the detailed operation menu indication 220 denotes the screen image shown in FIG. 4A.

Figure 6A:
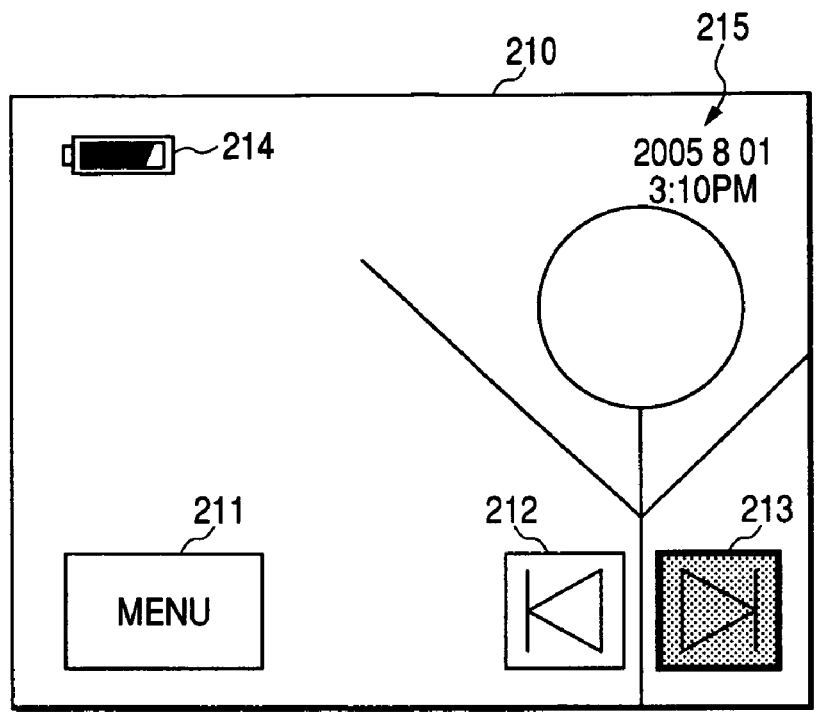
FIGS. 6A and 6B are diagrams showing the way of performing image data forwarding of the image data displayed on the external display device 200 with the operation keys displayed on the display section 50.
Figure 6B:
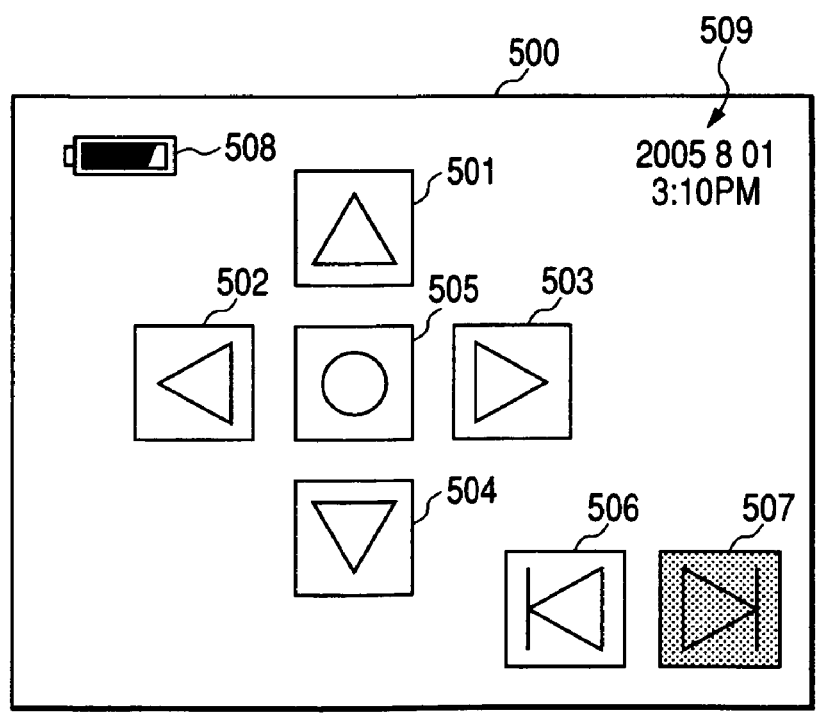

FIGS. 6A and 6B are diagrams showing the way of performing image data forwarding of the image data displayed on the external display device 200 with the operation keys displayed on the display section 50. In order for performing the image data forwarding on the image data displayed on the display screen 210 of the external display device 200, the image data forward key 507 displayed on the display screen 500 of the display section 50 shown in FIG. 6B is held down. Thus, the image data forwarding is performed on the image data displayed on the display screen 210 of the external display device 200. It should be noted that when the image data forward key 507 displayed on the display screen 500 of the display section 50 is held down, the image data forward indication 213 displayed on the display screen 210 of the external display device 200 is added with color as shown in FIG. 6A in response thereto.

Further, as another operation method for performing the image data forwarding on the image data, when moving the cursor to the image data forward indication 213 with the direction keys displayed on the display screen 500 of the display section 50, and then holding down the determination key 505, the image data forwarding is performed on the image data. It should be noted that the image data forwarding on the image data is continuously performed while the determination key 505 is continued to be held down. It should also be noted that although the image data forwarding on the image data is explained above, the image data back-feeding on the image data can be performed by the similar procedure, and accordingly, the explanation therefor will be omitted.

Figure 7:
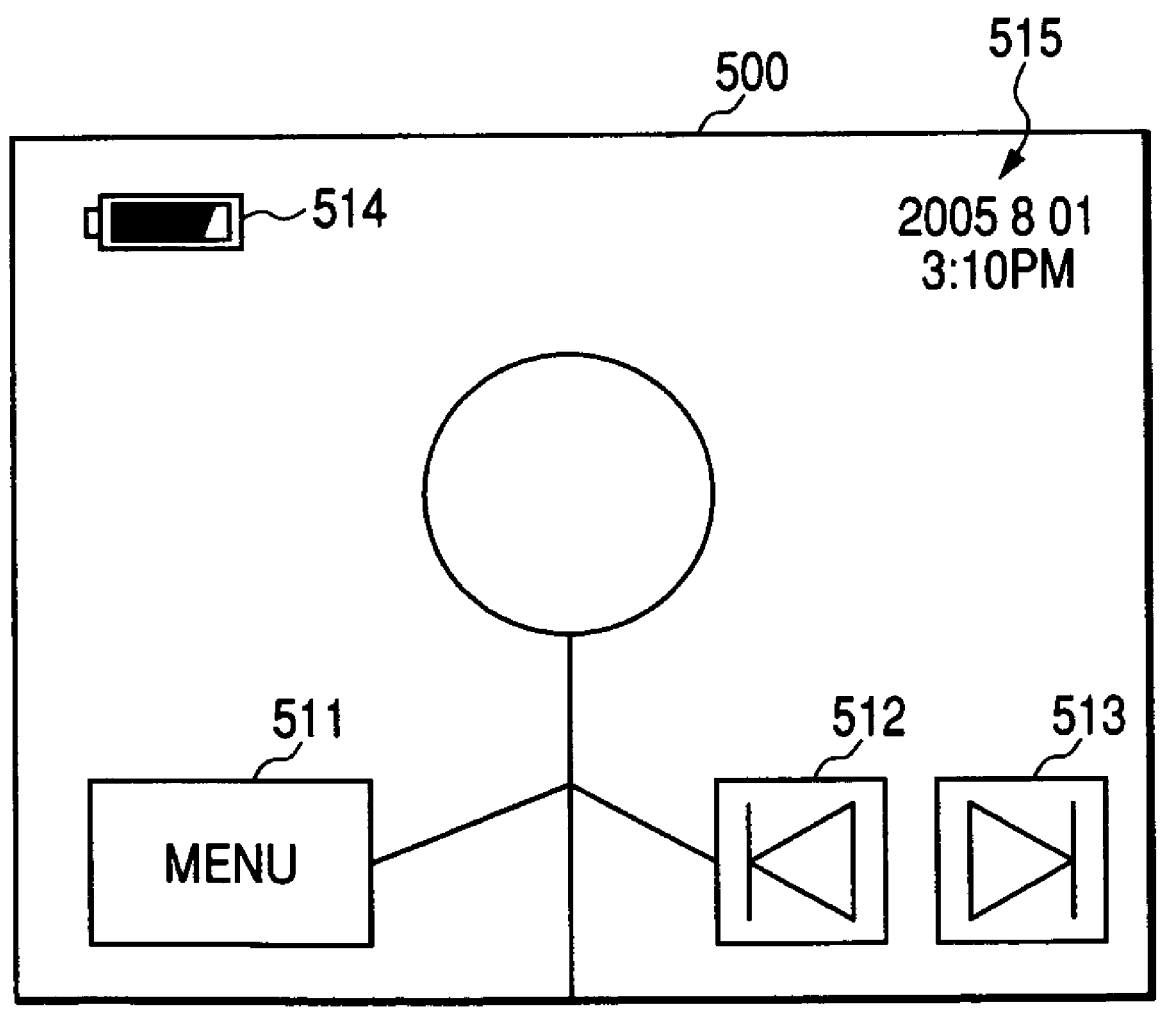
FIG. 7 is a diagram showing appearance of the display screen of the display section 50 in the case in which the output state detection section 82 does not detect that the external output section 81 is in the state in which image data can be output to the outside.

FIG. 7 is a diagram showing appearance of the display screen of the display section 50 in the case in which the output state detection section 82 does not detect that the external output section 81 is in the state in which image data can be output to the outside. In the case in which the output state detection section 82 does not detect that the external output section 81 is in the state capable of outputting the image data to the outside, the same screen image as the display screen 210 of the external display device 200 explained with reference to FIG. 4B is displayed on the display screen 500 of the display section 50.

Regarding the operation, it is performed by holding down the operation menu indication 511, the image data back-feed key 512, or the image data forward key 513 displayed on the display screen of the display section 50. When the operation menu indication 511 is held down, the display screen shown in FIG. 5A appears, and by holding down desired one of the items of the detailed operation menu indication, the function corresponding to that item of the detailed operation menu indication is performed.

The operation of the image pickup device 100 according to the embodiment of the invention will now be explained with reference to the drawings.

FIG. 8 is a flowchart showing a procedure before displaying the image data including the operation menu or the operation key image data on the display section 50 of the image pickup device 100 according to the embodiment of the invention. Firstly, the display data instruction section 31 judges whether or not the output state detection section 82 has detected that the external output section 81 is in the state capable of outputting the image data to the outside (step S911).

If the display data instruction section 31 judges that the output state detection section 82 has detected that the external output section 81 is in the state capable of outputting the image data to the outside, it instructs the display destination selection switch 133 to switch the supply destination of the image data including the operation menu to the external output section 81 (step S912). Namely, the display data instruction section 31 instructs the display destination selection switch 133 to turn on S4.

When S4 of the display destination selection switch 133 is turned on, the image data including the operation menu supplied from the image data processing section 132 is supplied to the external output section 81, and the external output section 81 outputs the image data including the operation menu to the external display device 200 (step S913). And, the image data including the operation menu is displayed on the external display device 200.

Further, if the display data instruction section 31 judges that the output state detection section has detected that the external output section 81 is in the state capable of outputting the image data to the outside, it instructs the display data selection switch 42 to select the operation key image data as the data to be supplied to the panel display section 51 (step S914). Namely, the display data instruction section 31 instructs the display data selection switch 42 to turn on S2.

When S2 of the display data selection switch 42 is turned on, the panel display section 51 is supplied with the operation key image data held in the operation key image data storage section 41 (step S915). And, the operation key image data is displayed on the panel display section 51.

On the contrary, if the display data instruction section 31 judges that the output state detection section 82 has not detected that the external output section 81 is in the state capable of outputting the image data to the outside in step S911, it instructs the display destination selection switch 133 to switch the display destination of the image data including the operation menu to the display data selection switch 42 (step S916). Namely, the display data instruction section 31 instructs the display destination selection switch 133 to turn on S3.

When S3 of the display destination selection switch 133 is turned on, the image data including the operation menu generated in the image data processing section 132 is supplied to the display data selection switch 42 (step S917).

Further, if the display data instruction section 31 judges that the output state detection section 82 has not detected that the external output section 81 is in the state capable of outputting the image data to the outside, it instructs the display data selection switch 42 to supply the panel display section 51 with the image data including the operation menu (step S918). Namely, the display data instruction section 31 instructs the display data selection switch 42 to turn on S1.

When S1 of the display data selection switch 42 is turned on, the image data including the operation menu generated in the image data processing section 132 is supplied to the panel display section 51 (step S919). And, the image data including the operation menu is displayed on the panel display section 51.

FIG. 9 is a flowchart showing a procedure of the operation to a panel input section 52 in the case in which the operation key image data is displayed on the display section 50 according to the embodiment of the invention. The operation instruction section 32 waits until the operation is executed on the panel input section 52 (step S921).

When the operation is executed on the panel input section 52, the operation instruction section 32 obtains the coordinates of the part of the display screen on which the operation is executed (step S922). Namely, when pressure such as holding-down is added on the panel input section 52, the coordinates of the part of the display screen on which the pressure is added are supplied to the operation instruction section 32 via the input control section 70. Thus, the operation instruction section 32 obtains the coordinates of the part of the display screen on which the operation is executed. Then, the operation instruction section 32 judges whether or not the obtained coordinates on the display screen are included in the area on the display screen corresponding to the direction keys (step S923).

It should be noted that the operation instruction section 32 includes the table having the predetermined operation instructions and areas on the display screen corresponding to each other as explained with reference to FIG. 2, and performs operation instruction corresponding to the coordinates on the display screen obtained by looking up the table. In the step S923, whether or not the operation is performed on the area of the display screen corresponding to the direction keys is judged with reference to the table.

If the operation instruction section 32 judges that the obtained coordinates on the display screen are included in the area on the display screen corresponding to the direction keys, the operation instruction section 32 instructs the image data processing section 132 to move the cursor in the direction corresponding to the direction key (step S924). And, after the display in which the cursor is moved according to the instruction is output, the process returns to the step S921, and waits until the next operation is executed.

Meanwhile, when the operation instruction section 32 judges that the obtained coordinates on the display screen are not included in the area on the display screen corresponding to the direction keys, the operation instruction section 32 then judges whether or not the obtained coordinates on the display screen are included in the area on the display screen corresponding to the determination key 505 (step S925).

If the operation instruction section 32 judges that the obtained coordinates on the display screen are included in the area on the display screen corresponding to the determination key 505, the operation instruction section 32 instructs the image data processing section 132, for example, to perform the function of the operation menu in which the cursor is located (step S926). And, after the function of the operation menu is performed in accordance with the instruction, the process returns to the step S921, and waits until the next operation is executed.

Meanwhile, when the operation instruction section 32 judges that the obtained coordinates on the display screen are not included in the area on the display screen corresponding to the determination key 505, the operation instruction section 32 then judges whether or not the obtained coordinates on the display screen are included in the area on the display screen corresponding to the image data back-feed key 506 or the image data forward key 507 (step S927).

If the operation instruction section 32 judges that the obtained coordinates on the display screen are included in the area on the display screen corresponding to the image data back-feed key 506 or the image data forward key 507, the operation instruction section 32 instructs the image data processing section 132, for example, to perform the image data back-feeding or the image data forwarding (step S928). And, after the image data back-feeding or the image data forwarding of the image data is performed in accordance with the instruction, the process returns to the step S921 and waits until the next operation is performed.

In contrast, if the operation instruction section 32 judges that the obtained coordinates on the display screen are not included in the area on the display screen corresponding to the image data back-feed key 506 or the image data forward key 507, the operation instruction section 32 returns to the step S921 and waits until the next operation is performed without performing any operation instructions.

As described above, according to the embodiment of the invention, in the case in which the external output cable connected to the external display device 200 is connected to the image pickup device of the embodiment of the invention, the image data including the operation menu is displayed on the external display device 200 while the operation keys are displayed on the display section 50 of the image pickup device to have the functions of the operation key without switching with the switching button or the like. Therefore, it becomes possible to operate the operation keys displayed on the image pickup device while looking at the image data including the operation menu displayed on the external display device 200.

It should be noted that although the descriptions are made regarding the image pickup device in the embodiment of the invention, the invention can also be applied to a portable terminal having the image pickup function.

It should also be noted that the embodiment of the invention shows an example for embodying the invention, and has relationships with the elements of appended claims, respectively, but is not limited thereto, and various modifications can be provided thereto within the scope and the spirit of the invention.

Namely, in an embodiment of the invention, the panel display means corresponds to the panel display section 51. Further, the external output means corresponds to, for example, the external output section 81. Still further, the output state detection means corresponds to, for example, the output state detection section 82. And, the display data instruction means corresponds to, for example, the display data instruction section 31. Further, the display data output means corresponds to, for example, the display data supply section 1000. Still further, the panel input means corresponds to, for example, the panel input section 52.

Still further, in another embodiment of the invention, the operation key image data storage means corresponds to, for example, the operation key image data storage section 41.

Further, the display data selection means corresponds to, for example, the display data selection switch 42. Still further, the display destination selection means corresponds to, for example, the display destination selection switch 90.

And, in still another embodiment of the invention, the operation menu image data storage means corresponds to, for example, the operation menu image data storage section 131. Further, the image data processing means corresponds to, for example, the image data processing section 132. Still further, the display destination selection switch corresponds to, for example, the display destination selection switch 133.

And, in another embodiment of the invention, the image data output means corresponds to, for example, the image data supply section 130. Further, the operation key image data storage means corresponds to, for example, the operation key image data storage section 41. Further, the display data selection means corresponds to, for example, the display data selection switch 42.

And, in still another embodiment of the invention, the operation menu image data storage means corresponds to, for example, the operation menu image data storage section 131. Further, the image data processing means corresponds to, for example, the image data processing section 132.

And, in another embodiment of the invention, the image pickup device corresponds to the image pickup device 100. Further, the external display device corresponds to, for example, the external display device 200. Still further, the panel display means corresponds to the panel display section 51. Further, the external output means corresponds to, for example, the external output section 81. Still further, the output state detection means corresponds to, for example, the output state detection section 82. And, the display data instruction means corresponds to, for example, the display data instruction section 31. Further, the display data output means corresponds to, for example, the display data supply section 1000. Still further, the panel input means corresponds to, for example, the panel input section 52.

It should be noted that the processing procedure explained in the embodiment of the invention can be taken as a method including the series of procedures, and can also be taken as a computer program for allowing a computer to perform the series of procedures, or a recording medium storing the computer program.

The invention claimed is :

1. An image pickup device, comprising:
   display means for displaying one of image data including an operation menu or operation key image data representing operation keys;
   external output means for outputting the image data including the operation menu to the outside;
   output state detection means for detecting that the external output means is in a state capable of outputting the image data to the outside;
   display data instruction means (i) for instructing to display the operation key image data representing the operation keys on the display means and to display the image data including the operation menu on an external display device, which is an output destination of the image data in the external output means, such that the operation key image data representing the operation keys is not displayed on the external display device and the image data including the operation menu is not displayed on the display means when the external output means is detected to be in the capable state, and (ii) for instructing to display the image data including the operation menu on the display means when the external output means is not detected to be in the capable state;
   display data supply means for supplying one of the display means or the external output means with one of the image data including the operation menu or the operation key image data in accordance with the instruction from the display data instruction means; and
   panel input means for accepting input of an operation from one of the operation key image data or the image data including the operation menu displayed on the display means,
   in which content of the image data including the operation menu is different from content of the operation key image data,
   in which the operation menu represents a number of selectable functions, and
   in which when the external output means is detected to be in the capable state the operation keys of the operation key image data displayed on the display means which are not displayed on the external display device are usable to select a desired function from the operation menu displayed on the external display device which is not displayed on the display means.

2. The image pickup device according to claim 1, wherein the display data supply means includes
   operation key image data storage means for storing the operation key image data,
   display data selection means for selecting one of the image data including the operation menu or the operation key image data to display on the display means in accordance with the instruction from the display data instruction means, and
   display destination selection means for selecting one of the display means or the external display device as a display destination of the image data including the operation menu in accordance with the instruction from the display data instruction means.

3. The image pickup device according to claim 2, wherein the display destination selection means includes
   operation menu image data storage means for storing operation menu image data representing the operation menu,
   image data processing means for generating and supplying the image data including the operation menu, and
   a display destination selection switch for selecting one of the display means or the external output means as a destination of the image data including the operation menu supplied from the image data processing means in accordance with the instruction from the display data instruction means.

4. The image pickup device according to claim 1, wherein the display data supply means includes
   image data supply means for supplying the display means and the external output means with the image data including the operation menu,
   operation key image data storage means for storing the operation key image data, and
   display data selection means for selecting one of the image data including the operation menu or the operation key image data to display on the display means in accordance with the instruction from the display data instruction means.

5. The image pickup device according to claim 4, wherein the image data supply means includes
   operation menu image data storage means for storing operation menu image data representing the operation menu, and
   image data processing means for generating and supplying the image data including the operation menu.

6. The image pickup device according to claim 1, wherein
the image data including the operation menu further includes an image data forward key for causing the display of successive image data next to the image data displayed on the display means, and an image data back-feed key for causing the display of previous image data displayed immediately before the image data displayed on the display means, and
the panel input means accepts input of an operation for displaying the successive image data from the image data forward key displayed on the display means and input of an operation for displaying the previous image data from the image data back-feed key displayed on the display means.

7. The image pickup device according to claim 1, wherein
the operation key image data includes image data representing a direction key that moves a cursor in the operation menu and a determination key that selects an operation from the operation menu, and
the panel input means accepts the operation from the operation menu from the direction key and the determination key displayed on the display means.

8. The image pickup device according to claim 7, wherein
the operation key image data further includes an image data forward key for causing the display of successive image data next to the image data displayed on the display means, and an image data back-feed key for causing the display of previous image data displayed immediately before the image data displayed on the display means, and
the panel input means accepts input of an operation for displaying the successive image data from the image data forward key displayed on the display means and the input of an operation for displaying the previous image data from the image data back-feed key displayed on the display means.

9. An image data display system, comprising:
an image pickup device; and
an external display device connected to the image pickup device;
wherein the image pickup device includes
display means for displaying one of image data including an operation menu or operation key image data representing operation keys,
external output means for outputting the image data including the operation menu to the outside,
output state detection means for detecting that the external output means is in a state capable of outputting the image data to the outside,
display data instruction means (i) for instructing to display the operation key image data representing the operation keys on the display means and to display the image data including the operation menu on an external display device, which is an output destination of the image data in the external output means, such that the operation key image data representing the operation keys is not displayed on the external display device and the image data including the operation menu is not displayed on the display means when the external output means is detected to be in the capable state, and (ii) for instructing to display the image data including the operation menu on the display means when the external output means is not detected to be in the capable state,
display data supply means for supplying one of the display means or the external output means with one of the image data including the operation menu or the operation key image data in accordance with the instruction from the display data instruction means, and
panel input means for accepting input of an operation from one of the operation key image data or the image data including the operation menu displayed on the display means,
in which content of the image data including the operation menu is different from content of the operation key image data,
in which the operation menu represents a number of selectable functions, and
in which when the external output means is detected to be in the capable state the operation keys of the operation key image data displayed on the display means which are not displayed on the external display device are usable to select a desired function from the operation menu displayed on the external display device which is not displayed on the display means.

10. An image pickup device, comprising:
a display that displays one of image data including an operation menu or operation key image data representing operation keys;
an external output section that outputs the image data including the operation menu to the outside;
an output state detector that detects that the external output section is in a state capable of outputting the image data to the outside;
a display data instruction section that (i) instructs to display the operation key image data representing the operation keys on the display and to display the image data including the operation menu on an external display device, which is an output destination of the image data in the external output section, such that the operation key image data representing the operation keys is not displayed on the external display device and the image data including the operation menu is not displayed on the display when the external output section is detected to be in the capable state, and (ii) instructs to display the image data including the operation menu on the display when the external output section is not detected to be in the capable state;
a display data supply that supplies one of the display or the external output section with one of the image data including the operation menu or the operation key image data in accordance with the instruction from the display data instruction section; and
a panel input that accepts input of an operation from one of the operation key image data or the image data including the operation menu displayed on the display,
in which content of the image data including the operation menu is different from content of the operation key image data,
in which the operation menu represents a number of selectable functions, and
in which when the external output section is detected to be in the capable state the operation keys of the operation key image data displayed on the display which are not displayed on the external display device are usable to select a desired function from the operation menu displayed on the external display device which is not displayed on the display.

11. An image data display system, comprising:

an image pickup device; and an external display device connected to the image pickup device;

wherein the image pickup device includes a display that displays one of image data including an operation menu or operation key image data representing operation keys, an external output section that outputs the image data including the operation menu to the outside, an output state detection section that detects that the external output section is in a state capable of outputting the image data to the outside, a display data instruction section that (i) instructs to display the operation key image data representing the operation keys on the display and to display the image data including the operation menu on an external display device, which is an output destination of the image data in the external output section, such that the operation key image data representing the operation keys is not displayed on the external display device and the image data including the operation menu is not displayed on the display when the external output section is detected to be in the capable state, and (ii) instructs to display the image data including the operation menu on the display when the external output section is not detected to be in the capable state, a display data supply that supplies one of the display or the external output section with one of the image data including the operation menu or the operation key image data in accordance with the instruction from the display data instruction section, and a panel input that accepts input of an operation from one of the operation key image data or the image data including the operation menu displayed on the display, in which content of the image data including the operation menu is different from content of the operation key image data, in which the operation menu represents a number of selectable functions, and in which when the external output section is detected to be in the capable state the operation keys of the operation key image data displayed on the display which are not displayed on the external display device are usable to select a desired function from the operation menu displayed on the external display device which is not displayed on the display.

* * * * *